United States Patent

[11] 3,628,848

| [72] | Inventor | Georges Nomarski<br>Bourg la Reine, France |
|---|---|---|
| [21] | Appl. No. | 887,621 |
| [22] | Filed | Dec. 23, 1969 |
| [45] | Patented | Dec. 21, 1971 |
| [73] | Assignee | Etablissement Public: Agence Nationale de Valorisation de la Recherche "ANVAR"<br>Hauts-de-Seine, France |

[54] VARIABLE PHASE CONTRAST MICROSCOPY
8 Claims, 8 Drawing Figs.

[52] U.S. Cl. ..................................... 350/13,
350/12, 350/14, 350/157
[51] Int. Cl. ....................................... G02b 27/28
[50] Field of Search .......................... 350/12–15,
157; 505/A

[56] References Cited
UNITED STATES PATENTS

| 2,516,905 | 8/1950 | Osterberg et al. ............ | 350/13 |
|---|---|---|---|
| 2,700,918 | 2/1955 | Osterberg et al. ............ | 350/13 |
| FOREIGN PATENTS | | | |
| 647,191 | 12/1950 | Great Britain ................ | 350/13 |
| 648,801 | 1/1951 | Great Britain ................ | 350/13 |

OTHER REFERENCES

Jerrard, " Optical Compensators" J.O.S.A. Vol. 38, No. 1, (Jan, 1948) pp. 35–59.

*Primary Examiner*—David Schonberg
*Assistant Examiner*—Paul R. Miller
*Attorney*—Littlepage, Quantance, Wray & Aisenberg ABSTRACT: In phase contrast microscopy, the phase plate is broken down into two zones, the conjugate and complementary zones, the light beam is polarized in two directions inclined relatively at 45°. One polarization affects the conjugate zone; the other polarization affects the complementary zone, without optical path delay. The apparatus employs a polarizer, a phase plate, a birefringent compensator, and an analyzer having a phase plate with two polarizers turned 45° and respectively occupying the conjugate zone and the complementary zone of the plate. One polarizer is positioned in front of the plate so it covers the two zones and is parallel to the polarizer at the conjugate zone. The birefringent compensator and analyzer are mounted behind the plate, in the direction of light propagation, so that the transmissions of complex amplitudes of the conjugate zone will be $1-e^i$ and that of the complementary zone will be 1.

Georges Nomarski
Inventor

By Littlepage, Quaintance, Wray & Aisenberg
Attys.

VARIABLE PHASE CONTRAST MICROSCOPY

The present invention relates to improvements in microscopy with variable phase contrast observation; it likewise relates to an optical device for observation by phase contrast of transparent or nonabsorbent objects or more generally objects belonging to the class of phase objects.

Numerous variable phase contrast devices have been proposed, all of which contain polarizer means and a phase plate, but these devices have not given the expected industry results. In these known devices for phase contrast observation, the basic phase shift, which must normally be equal to $\pm \pi/2$, is obtained by using an optical delay. In these conditions, that is to say when an optical delay is brought into use, the phase $\rho$ is expressed by:

$$\rho = (2\pi/\lambda) \Delta,$$

where the optical delay $\Delta$ is $$\Delta = (\lambda_0/4)$$

$\lambda_0$ is the mean wavelength and $\lambda$ the wavelength considered; the result is that $\rho(\lambda) = (\pi/2)(\lambda_0/\lambda)$, which explains why in known devices, where an optical delay is used, the phase shift is equal to $\pi/2$ only if $\lambda = \lambda_0$ and the basic phase shift varies with the wavelength.

In order to avoid the disadvantages of known devices, which require double regulation, it has been attempted to operate in accordance with a process-permitting regulation by a single control, so as to have the benefit of the following advantages: firstly, this single control can be calibrated and thus supplies a means of measuring the optical thickness of the object studied; on the other hand, by acting simultaneously on the phase shift and on the absorption of the phase plate, said control has the effect that an object of any optical thickness, which is not necessarily small in relation to the wavelength, appears with a contrast equal to 1, that is to say the image of the detail studied becomes black on a light background. This last phenomenon serves as a criterion of perfect compensation and can therefore easily be used for measurements.

Starting from this basic idea of the present invention, the physical and mathematical theories established on phase contrast observation have been reexamined in detail. If the vectorial diagrams of phenomena are examined with the object amplitude (Vector $V_1$ [$V_1 = e^{i\varphi}$]), referring to FIG. 1 of the drawings and eliminating the arrows designating the vectors in order to simplify writing, it is seen that the vector $V_1$ is broken down into two vectors $V_0$ and $V_2$ in accordance with the vectorial equation $V_1 = V_0 + V_2$ (FIG. 1a).

If it is desired to cancel the light inside the object, it is necessary and sufficient that the vector $V_0$ of modulus equal to 1 should be replaced by the vector $V_3 = -V_2$.

In this analysis the vector $V_0$ represents so-called direct light, which means that in order to "extinguish" the object it is necessary to make a phase shift of $V_0$ by the angle $\psi = -(\pi/2 - \rho/2)$ and to reduce its modulus from 1 to $2 \sin \rho/2$. This means that the optimum adjustment of the variable phase contrast is obtained by satisfying the following two simultaneous conditions:

1. The energy transparency of the so-called "conjugate" zone of the phase plate must be brought to the value
   $4 \sin^2 \rho/2 = 2(1 - \cos \rho)$.
2. The phase shift $\psi$ of the said conjugate zone must be equal to $-(\pi/2) + (\rho/2)$.

These considerations have been set out in detail by various authors (particularly on the one hand Bennett and others, "Phase microscopy: Principles and applications" John Wiley & Sons, publishers, New York 1957, and on the other hand "Les contrastes de phase et le contraste par interférence" (Conference of the International Optics Commission, 15th–21st Mar. 1951), Maurice Francon, publishers, Editions de la Revue d'Optique).

Various authors, for example, H. Osterberg with his POLANRET system and U.S. Pat. No. 2,516,905, have proposed the solution of the problem posed by forming the phase plate with two crossed polarizers followed by a birefringent "quarter wave" plate completed by a variable compensator, the whole arrangement being disposed between a polarizer and an analyzer. In this case the quarter-wave plate effects the main phase shift equal to $\pm(\pi/2)$, while the compensator makes it possible to add the small phase shift equal to $\rho/2$. The transmission of the conjugate zone is then adjusted by rotating the analyzer. It is seen immediately that this solution, if used in the previously mentioned known devices, has the two disadvantages already referred to, which the invention makes it possible to avoid, as will be seen later on, and which are that:

1. optimum regulation must be effected by acting on two independent parameters, in order to adjust the latter;
2. the main phase shift of $\pi/2$ is obtained by means of a delay of $\lambda/4$ which is essentially chromatic, because it depends on the wavelength of the illumination light.

Thus, going back to the conclusions drawn from the vectorial diagram in FIG. 1a, it was found that a solution of the problems posed could be obtained according to the present invention by treating the vector $V_0$ without subjecting it to the rotation, $\psi$ and to the diminution of magnitude described in connection with FIG. 1a. If, as illustrated in FIG. 1b, the vector $(-V_1)$ is added to the vector $V_0$, there is obtained a vector $V_3$ defined by $V_3 = V_0 - V_1$ that is to say $1 - e^{i\varphi}$. This means that contrast corresponding to the cancellation of light inside the object can be obtained by opposing the vector $v_0$ representing the coherent background by a vector opposite to the vector $V_1$ representing the object. The result corresponding to ideal conditions of observation of an object of phase $\rho$ can be achieved by imparting, to the conjugate zone (represented by the vector $V_3 = 1 - e^{i\varphi}$) of the plate, the complex amplitude transmission $1 - e^{i\varphi}$ and, to the complementary zone (vector $V_0 = 1$), a transmission equal to 1.

The improvements made in the observation variable phase contrast microscopy, utilizing a phase shift of $\pi/2$ and a variable phase shift, consist fundamentally according to the invention in breaking down the phase plate into two zones known respectively as the conjugate and the complementary zone, and polarizing the light beam in two directions inclined at 45° in relation to one another, one of the polarizations affecting the conjugate zone and the other the complementary zone, without optical path delay.

The invention also relates to an apparatus for putting the above-defined process into practice. An apparatus of this type for observation by variable phase contrast microscopy utilizing polarizer means, a phase plate, a birefringent compensator, and an analyzer comprises essentially a phase plate consisting of two polarizers turned by 45° in relation to one another and respectively occupying the conjugate zone and the complementary zone of said plate, one polarizer being disposed in front of said plate in such a manner that it covers the two aforesaid zones and that it is parallel to the polarizer occupying the conjugate zone of the plate, and an assembly composed in known manner of a birefringent compensator and an analyzer being mounted behind the plate, in the direction of propagation of the light, in such a manner that the transmission of complex amplitudes of the conjugate zone will be equal to $1 - e^{i\varphi}$ and that of the complementary zone will be equal to 1.

The polarizers are advantageously joined by adhesive bonding between two glass plates, the polarizers forming the phase plate having zones in which the polarizing action is suppressed by any suitable known photochemical treatment, said zones covering respectively the conjugate zone and the complementary zone.

The compensator may may be of a SENARMONT type, which is known in itself, and be provided with angular references making it possible to measure phase objects.

The phase plate is preferably placed in a plane conjugate to the focal plane of the objective in relation to an optical vehicle of a magnification preferably equal to $-1$.

The conjugate zone of the phase plate preferably has an annular zone the relative surface of which does not exceed 12 percent of the surface corresponding to the image of the outlet pupil of the objective used, which is projected on to the phase plate.

With reference to FIGS. 2 and 3 there are described below various forms of construction of an observation device according to the invention.

Figure 1A:
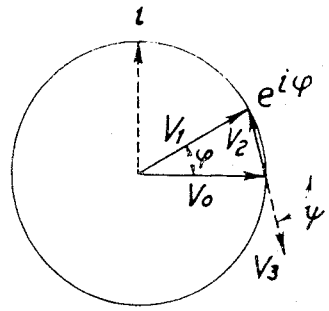
FIG. 1a and 1b represent phenomena occurring in known theories established on phase contrast observation.
Figure 1B:
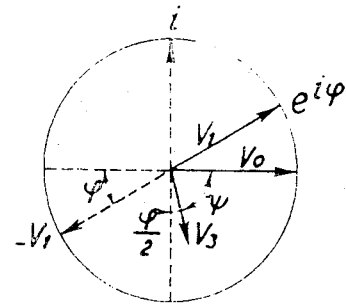
Figure 2:
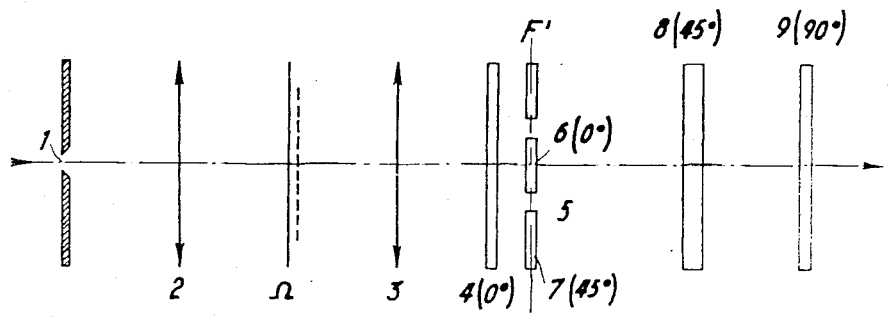
FIG. 2 is a diagrammatic view of a first example of the invention, applied to microscopy.

In the case of FIG. 2, a quasi-point source 1 transmits through a condenser 2 a parallel beam to the phase object $\Omega$. At the outlet of the object $\Omega$ the beam is broken down into a direct beam which, after passing through the objective 3, passes through a polarizer 4 focused on the central portion of the phase plate 5, known as the "conjugate zone," and a diffracted beam which passes entirely through the phase plate 5, being mainly affected by the transmission of the portion which surrounds the conjugate zone and known as the "complementary zone." The polarizer 4 is of the undivided type. The phase plate 5 proper is constituted by a polarizer 6 having the same orientation as the polarizer 4 situated in the conjugate zone, and a polarizer 7 oriented at 45° in relation to the polarizer 4 and occupying the complementary zone (see FIGS. 6 and 7).

The phase plate 5, which in the example in placed in the focal plane F' of the objective 3, is conjugate to the source 1 in relation to the assembly comprising the condenser 2 and objective 3. After the plate 5 the device comprises a birefringent compensator 8 symbolized by a birefringent plate of variable thickness and introducing a phase difference $\Phi$ between the two waves polarized at 90° in relation to one another. The neutral lines of this compensator are directed at ±45° in relation to the polarizer 4. Finally, an analyzer 9 crossed with the polarizer 4 completes the arrangement. The real image of the object is projected beyond the drawing and is not illustrated.

Figure 4:
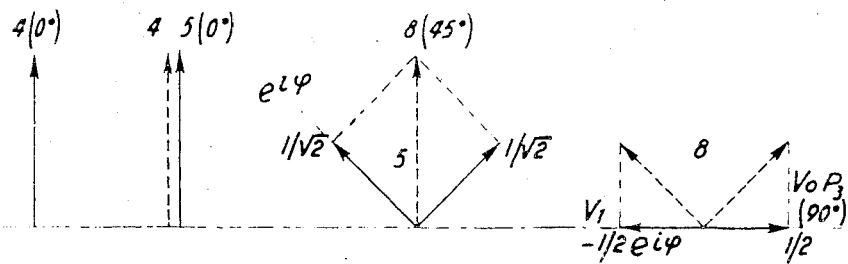
FIGS. 4 and 5 show diagrams representative of phenomena occurring in the conjugate an the complementary zones.
Figure 5:
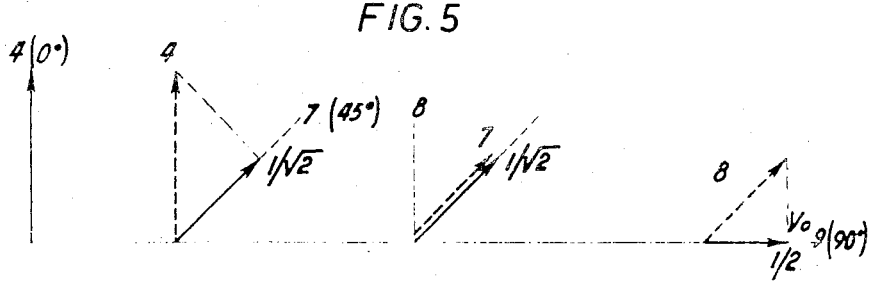

FIGS. 4 and 5 illustrate the evolution undergone respectively by the complex amplitudes of the direct wave and of the wave diffracted through the component elements of the device.

For the direct light, FIG. 4 the light polarized by the polarizer 4 undergoes no modification through the effect of the polarizer 6, but it is decomposed by the compensator 8 into two perpendicular vibrations, of which the two complex amplitudes are $1/\sqrt{2}$ and $1/\sqrt{2}e^{i\varphi}$. The analyzer transmits only two antiparallel components of amplitudes ½ and ½ $e^{i\varphi}$.

For the diffracted light FIG. 5 it is seen that the polarizer 7 of the complementary zone transmits only a component directed at +45°.

The compensator 8 does not modify its amplitude in anyway, the latter remaining equal to $1/\sqrt{2}$; finally, the analyzer 9 transmits the component perpendicular to the polarizer 4 of amplitude ½.

There is thus finally obtained a complex amplitude transmission of direct light equal to a constant close to $1-e^i$, while that of the direct light is equal to 1.

By then bringing the phase shift $\Phi$ of the compensator 8 to the value $\rho$ of the local object $\Omega$ phase shift, an optimum image of the studied detail of the object is obtained.

It is clearly seen that under the conditions of the invention the only variable parameter is here the value $\Phi$, which is adjustable by means of the birefringent compensator 8 of known type.

Figure 3:
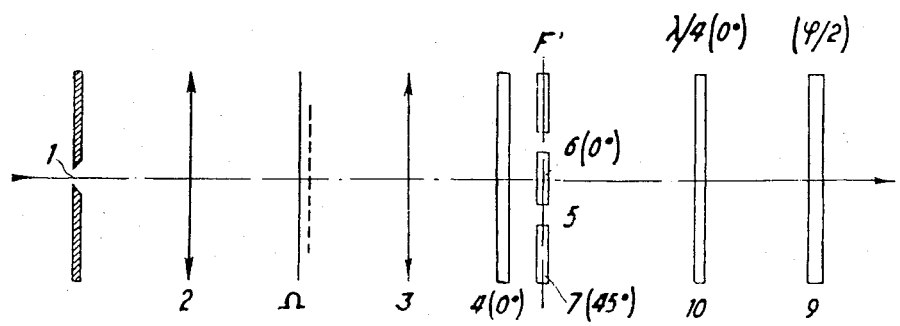
FIG. 3 is a similar view of a modification.

Instead of the compensator illustrated in FIG. 2, it is possible to use with advantage a SENARMONT compensator because of its simplicity and linearity; as illustrated in FIG. 3, a compensator of this type is composed of a quarter-wave plate 10, usually of mica and the slow axis of which is parallel to the polarizer, and a rotating analyzer 9. A phase shift $\Phi$ is obtained by turning the analyzer through the angle $\Phi/2$.

Figure 6:
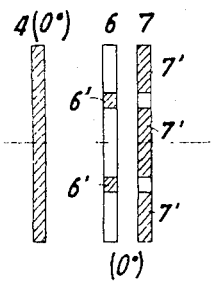
FIGS. 6 and 7 are views, respectively in section and in plan, of the first polarizer and of the phase plate.
Figure 7:
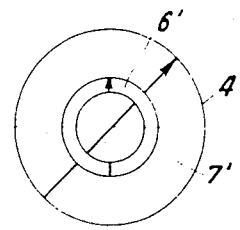

FIGS. 6 and 7 show "dismantled" an advantageous form of construction of a phase plate composed of three polarizers 4, 6, and 7, assembled by adhesively bonding three polarizing sheets between two glass plates. The first sheet 4 is in the undivided state, while the sheets 6 and 7 have nonpolarizing zones (6' and 7') which mutually complete one another. The shape of the conjugate zone and also that of the source may advantageously be annular, as is well known.

It is not always materially possible to place the assembly constituting the phase plate 4, 6, 7 in the focal plane F' of the objective 3. It is then possible to use an optical vehicle of any type known in itself which reproduces at a greater distance the real image of this focal plane, which is usually not accessible in a usual microscope objective.

Figure 8:
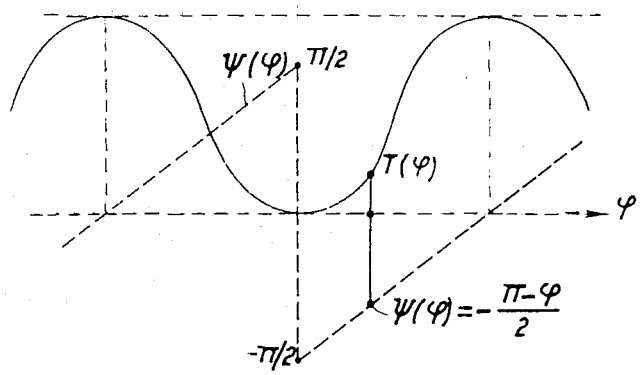
FIG. 8 is a diagram from which it is possible to determine the energy transmission T and the phase shift ($\psi$) of the conjugate zone of the phase plate in dependence on the phase $\rho$.

In FIG. 8 there is illustrated a diagram permitting determination of the transmission T in dependence on the phase $\rho$(cosinusoidal curve) and the phase shift $\psi$ in dependence on the same phase $\rho$(broken line sawtooth curve):

$$T = t^2 = 2(1 - \cos \rho)$$
$$\tan \psi = (-\sin\rho / 1 - \cos \rho)$$

I claim:

1. In a method of performing variable phase contrast microscopic observation, projecting light from a source toward an image through an optical system having a phase plate and utilizing a main phase shift of $\pi/2$ and a variable phase shift, the improvement comprising separating the phase plate into two zones, comprising a conjugate zone and a complementary zone, and polarizing the light beam in two directions at 45° to one another, one of the polarizations being operative in the conjugate zone and the other polarization being operative in the complementary zone, without optical path delay.

2. A device for variable phase contrast microscopic observation, a light source input comprising polarizing means, a phase plate, a birefringent compensator, and an analyzer, and a light output, the phase plate consisting of two polarizers operative at 45° to one another and respectively occupying a conjugate zone and a complementary zone of said plate, one polarizer being disposed in front of said plate and covering the two said zones and being parallel to the polarizer which occupies the conjugate zone of the plate, and an assembly composed of a birefringent compensator and an analyzer being mounted behind the plate, in the direction of propagation of the light, in a position compatible with the transmission of complex amplitudes of the conjugate zone being equal to $1-e^{i\varphi}$ and with that of the complementary zone being equal to 1.

3. A device as claimed in claim 2, wherein the polarizers are united by adhesive bonding between two glass plates and wherein the phase plate thereby formed has zones in which polarizing action is suppressed, said zone respectively covering the conjugate zone and the complementary zone.

4. A device as claimed in claim 2, wherein the compensator is a Senarmont compensator.

5. A device as claimed in claim 2, wherein said compensator is provided with angular references enabling measurements of phase objects to be effected.

6. A device as claimed in claim 2, wherein the phase plate is placed in a plane conjugate to the focal plane of the objective in relation to an optical vehicle.

7. A device as claimed in claim 6, wherein said optical vehicle has a magnification equal to $-1$.

8. A device as claimed in claim 2, wherein the conjugate zone of the phase plate has an annular zone the relative surface of which forms at most 12 percent of the corresponding surface of the image of the outlet pupil of the objective used, which is projected on to the phase plate.

* * * * *